United States Patent
Hirahara et al.

(10) Patent No.: US 12,405,522 B2
(45) Date of Patent: Sep. 2, 2025

(54) LIGHT SOURCE DEVICE AND PROJECTOR

(71) Applicant: Sharp NEC Display Solutions, Ltd., Tokyo (JP)

(72) Inventors: Sota Hirahara, Tokyo (JP); Masateru Matsubara, Tokyo (JP)

(73) Assignee: SHARP NEC DISPLAY SOLUTIONS, LTD., Tokyo (JP)

( * ) Notice: Subject to any disclaimer, the term of this patent is extended or adjusted under 35 U.S.C. 154(b) by 385 days.

(21) Appl. No.: 17/912,016

(22) PCT Filed: Mar. 18, 2020

(86) PCT No.: PCT/JP2020/011965
§ 371 (c)(1),
(2) Date: Sep. 15, 2022

(87) PCT Pub. No.: WO2021/186612
PCT Pub. Date: Sep. 23, 2021

(65) Prior Publication Data
US 2023/0140762 A1    May 4, 2023

(51) Int. Cl.
*G03B 21/20*    (2006.01)

(52) U.S. Cl.
CPC ....... *G03B 21/204* (2013.01); *G03B 21/2053* (2013.01); *G03B 21/2073* (2013.01); *G03B 21/208* (2013.01)

(58) Field of Classification Search
CPC .............. G03B 21/204; G03B 21/2053; G03B 21/2073; G03B 21/208; G03B 21/2013

(Continued)

(56) References Cited

U.S. PATENT DOCUMENTS

2009/0059992 A1    3/2009  Sumiyama et al.
2019/0033697 A1*   1/2019  Akiyama ........... G03B 21/2013
2019/0196317 A1*   6/2019  Akiyama ........... G03B 21/2033

FOREIGN PATENT DOCUMENTS

CN    101855902 A    10/2010
CN    109061895 A    12/2018
(Continued)

OTHER PUBLICATIONS

International Search Report (ISR) (PCT Form PCT/ISA/210), in PCT/JP2020/011965, dated Jun. 9, 2020.
(Continued)

*Primary Examiner* — Magda Cruz
(74) *Attorney, Agent, or Firm* — MCGINN I.P. LAW GROUP, PLLC

(57) ABSTRACT

A light source device includes a first laser source and a diffusion element that diffuses light, the diffusion element being provided on an optical path of a first laser beam emitted by the first laser source. The diffusion element comprises, on an incident surface, a first lens array in which a plurality of first lens elements are arranged that divide the first laser beam into a plurality of light beams and further comprises, on an exit surface, a second lens array in which a plurality of second lens elements are arranged that each face a respective first lens element of the plurality of first lens elements and that each emit a light beam incident through the facing first lens element toward an imaging surface. Each second lens element forms a light source image in a different region on the imaging surface.

10 Claims, 4 Drawing Sheets

(58) Field of Classification Search
USPC .......................................................... 353/20
See application file for complete search history.

(56) References Cited

FOREIGN PATENT DOCUMENTS

| | | |
|---|---|---|
| CN | 109375462 A | 2/2019 |
| CN | 109375463 A | 2/2019 |
| JP | 2013-171172 A | 9/2013 |
| JP | 2013-195501 A | 9/2013 |
| JP | 2014-163974 A | 9/2014 |
| JP | 2014-191248 A | 10/2014 |
| JP | 2014-215319 A | 11/2014 |
| JP | 2015-106130 A | 6/2015 |
| JP | 2015-184401 A | 10/2015 |
| JP | 2016-186566 A | 10/2016 |
| JP | 2018-040881 A | 3/2018 |
| JP | 2018-041564 A | 3/2018 |
| JP | 2019-158914 A | 9/2019 |
| JP | 2020-008722 A | 1/2020 |
| WO | WO-2018173212 A1 * | 9/2018 ............. G03B 21/14 |

OTHER PUBLICATIONS

Chinese Office Action dated Jul. 28, 2023, in corresponding Chinese Patent Application No. 202080098512.X, with an English translation thereof.

* cited by examiner

[Fig. 1]
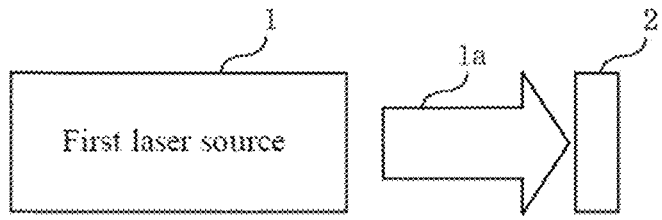
[Fig. 2]
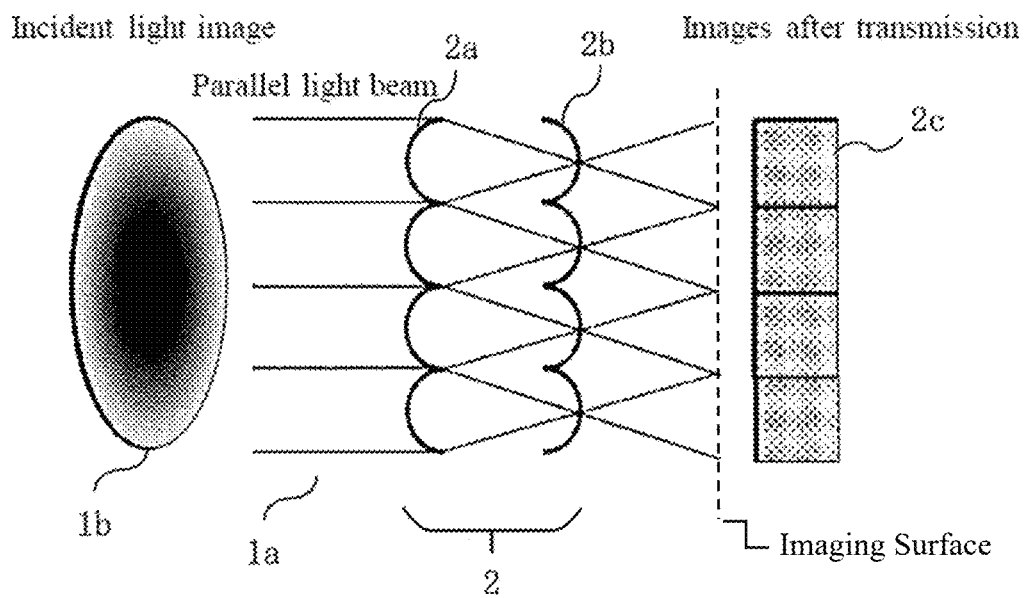
[Fig. 3]
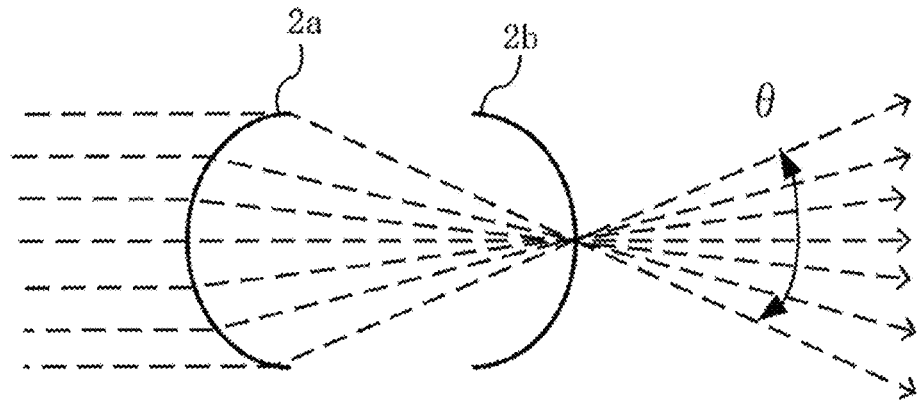

[Fig. 4]
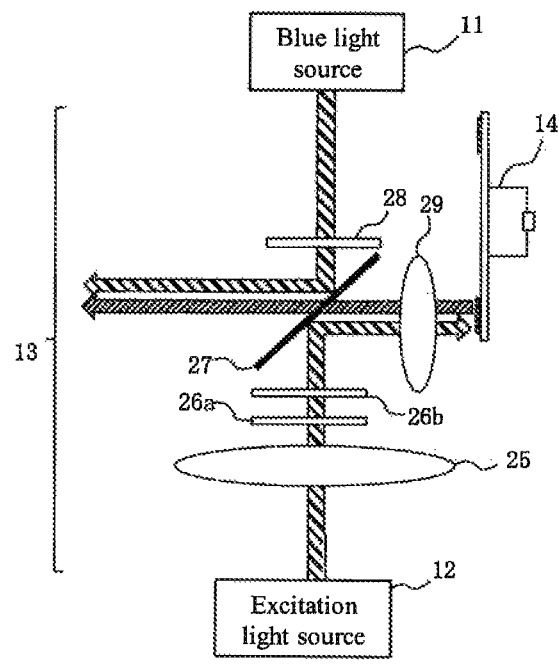
[Fig. 5]
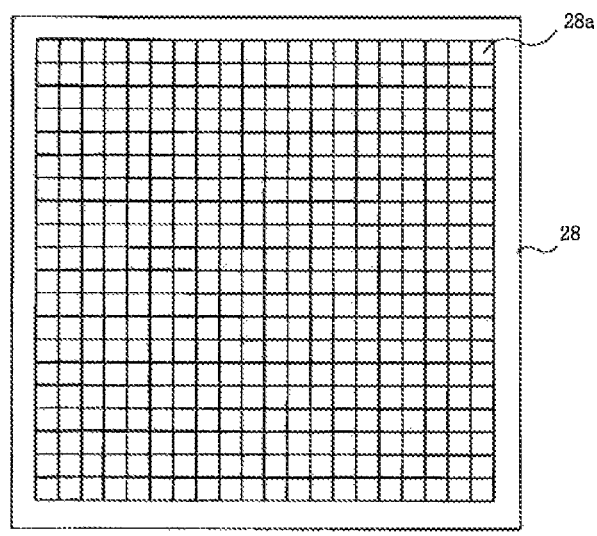

[Fig. 6]
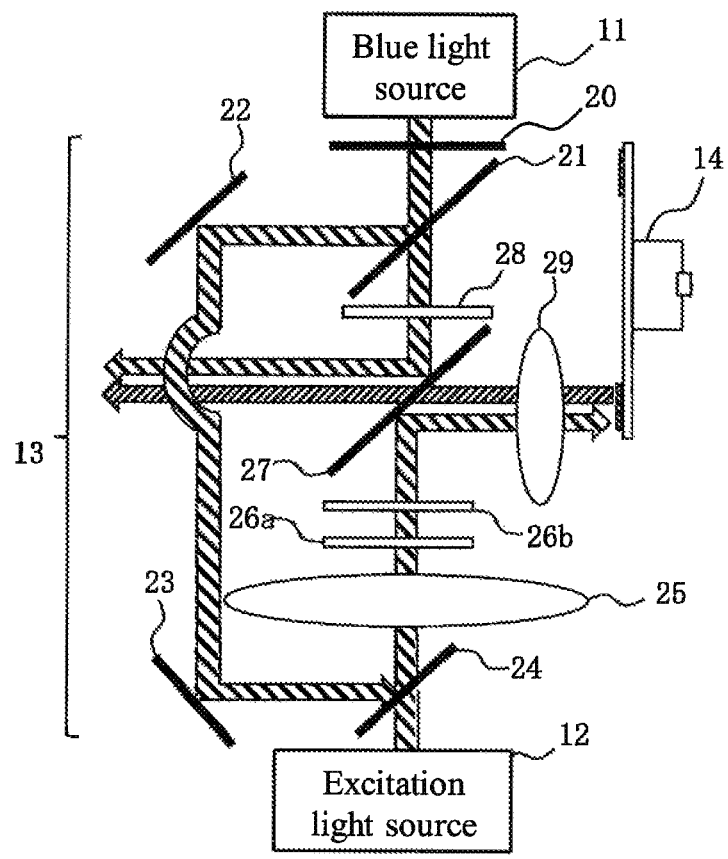
[Fig. 7A]
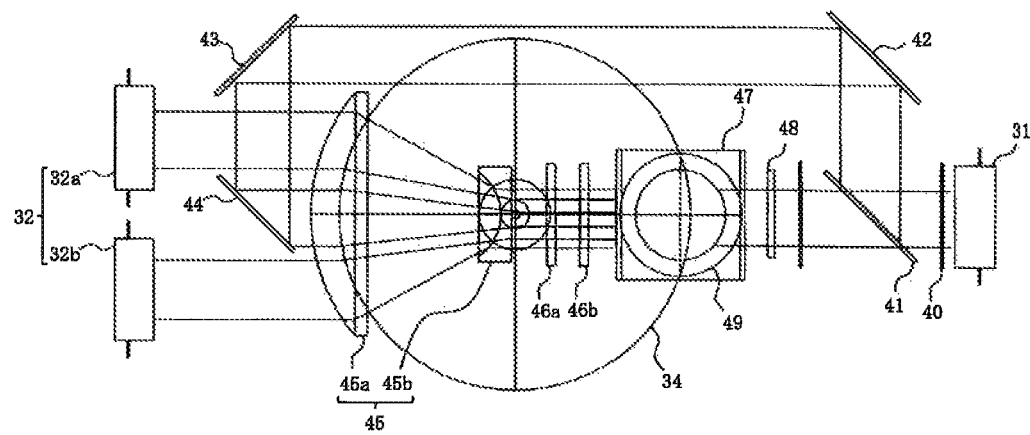

[Fig. 7B]
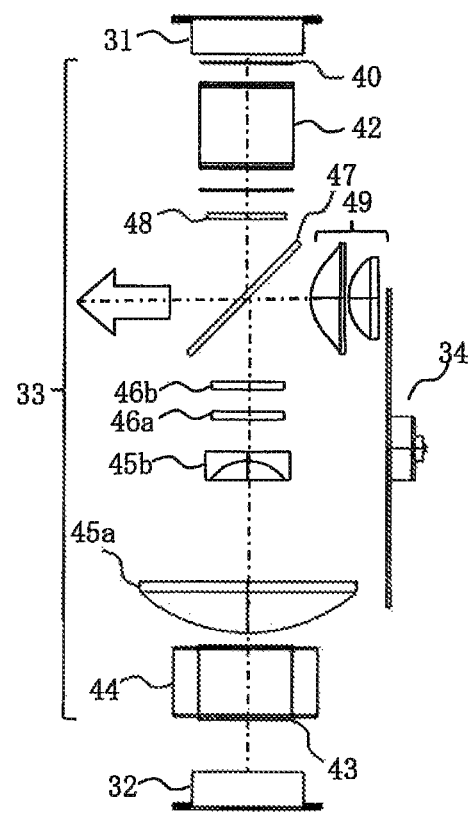
[Fig. 8]
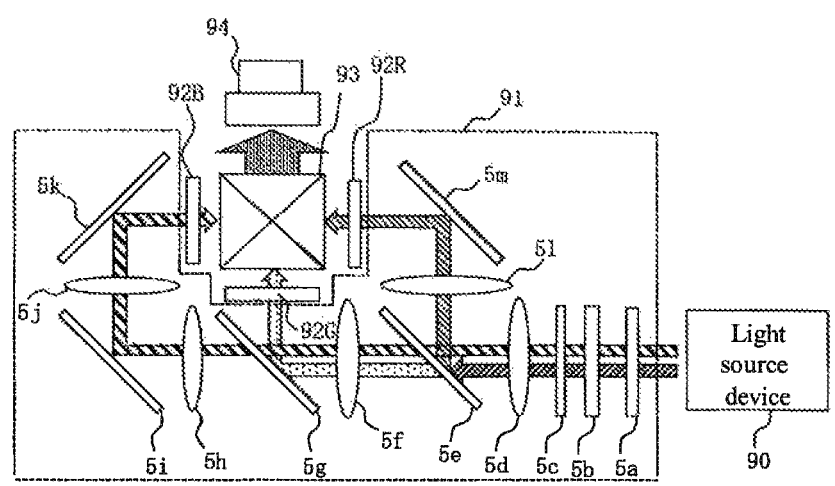

LIGHT SOURCE DEVICE AND PROJECTOR

TECHNICAL FIELD

The present invention relates to a light source device having a laser source and a projector.

BACKGROUND ART

In a projector that modulates a laser beam to form an image, speckle-like noise called speckle is generated in the projected image. In order to reduce this speckle noise, a diffusion plate is generally arranged on the optical path of the laser beam.

Patent Document 1 describes a light source device in which a light diffusion element of the transmission type is arranged on the optical path of the laser beam. The light diffusion element includes a rotatable circular substrate, and a light diffusion layer provided on the first main surface of the substrate. The light diffusion layer includes a plurality of diffusion regions arranged in the circumferential direction, and the adjacent diffusion regions have different diffusion characteristics from each other.

By rotating, the substrate and causing the laser beam to be incident sequentially in each diffusion region, the diffusion angle of light that has passed through the light diffusion element changes in time, Thus, since the speckle noise of the projected image changes in time, the observer can observe an image in which the speckle noise is superimposed in time. As a result, good images with reduced speckle noise can be provided.

PRIOR ART DOCUMENT

Patent Document

Patent Document 1: JP-A-2014-163974

DISCLOSURE OF THE INVENTION

Problems to be Solved by the Invention

However, in the light source device described in Patent Document 1, since a mechanism or the like for rotating the substrate of the light diffusion element is required, the device becomes large, and the device cost is also increased.

It is an object of the present invention to provide a light source device and a projector with a simple configuration that is capable of solving the above problems, preventing increase in the size of the device, and reducing speckle noise.

Means for Solving the Problems

To achieve the above object, the light source device of the present invention includes a first laser source, and a diffusion element that diffuses light, the diffusion element being provided on an optical path of a first laser beam emitted by the first laser source. The diffusion element comprises, on an incident surface, a first lens array in which a plurality of first lens elements are arranged that divide the first laser beam into a plurality of light beams and further comprises, on an exit surface, a second lens array in which a plurality of second lens elements are arranged that face respective first lens elements of the plurality of first lens elements and that each emit a light beam incident through the facing first lens element toward an imaging surface. Each second lens element forms a light source image in a different region on the imaging surface.

The projector of the present invention includes the light source device, a light modulation unit that modulates light emitted from the light source device to form an image, and a projection lens that projects the image formed by the light modulation unit.

Effect of the Invention

According to the present invention, it is possible to prevent enlargement of the device and reduce speckle noise with a simple configuration.

BRIEF DESCRIPTION OF THE DRAWINGS

FIG. 1 is a block diagram showing a configuration of a light source device according to a first embodiment of the present invention.

FIG. 2 is a schematic diagram showing a specific configuration of a diffusion element of the light source device shown in FIG. 1.

FIG. 3 is a schematic diagram showing a state in which a laser beam is diffused by the first lens element and the second lens element in the light source device shown in FIG. 1.

FIG. 4 is a block diagram schematically showing a configuration of a light source device according to a second embodiment of the present invention.

FIG. 5 is a schematic diagram showing an example of a micro lens array on an incident surface of a diffusion element of the light source device shown in FIG. 4.

FIG. 6 is a block diagram schematically showing a configuration of a light source device according to a third embodiment of the present invention.

FIG. 7A is a side view schematically showing a configuration of a light source device according to a fourth embodiment of the present invention.

FIG. 7B is a top view schematically showing the configuration of the light source device according to the fourth embodiment of the present invention.

FIG. 8 is a schematic diagram showing a configuration of a projector according to an embodiment of the present invention.

BEST MODE FOR CARRYING OUT THE INVENTION

Next, embodiments of the present invention will be described with reference to the drawings.

First Embodiment

FIG. 1 is a block diagram showing a configuration of a light source device according to a first embodiment of the present invention. Referring to FIG. 1, the light source device of the present embodiment includes first laser source 1, and diffusion element 2 for diffusing light. First laser source 1 emits first laser beam 1a. Diffusion element 2 is provided on the optical path of first laser beam 1a emitted by first laser source 1.

FIG. 2 is a schematic diagram showing a specific configuration of diffusion element 2. As shown in FIG. 2, diffusion element 2 comprises, on the incident surface, a first lens array in which a plurality of first lens elements 2a that divide first laser beam 1a into a plurality of light beams are arranged. Diffusion element 2 further comprises, on the exit surface, a second lens array in which a plurality of second lens elements 2b are arranged that are provided so as to face respective first lens elements of the plurality of first lens elements 2a and that each emit the light beam incident through the facing first lens element 2a toward a imaging surface. Each second lens element 2a forms light source image 2c in a different region on the imaging surface.

In the example of FIG. 2, light source image 1b of first laser source 1 is shown. First laser source 1 is, for example, an LD (laser diode). The emission point of the LD is small, and the light intensity distribution thereof follows Gaussian distribution. First laser beam 1a emitted from light source image 1b having an elliptical shape is a pseudo-parallel light and is known as a Gaussian beam.

Incidentally, when viewing diffusion element 2 from a direction perpendicular to the incident surface or the exit surface, first lens elements 2a and second lens elements 2b both constitute square cells. Therefore, in the example of FIG. 2, rectangular light source image 2c is shown. In other words, diffusion element 2 may be referred to as an element that converts light source image 1b of the elliptical shape into a plurality of square light source images 2c. On the imaging surface, each light source image 2c is arranged so as not to overlap each other. In the example of FIG. 2, rectangular light source images 2c are arranged without gaps, but the present invention is not limited thereto. Parts of adjacent rectangular light source images 2c may overlap each other. Further, from the viewpoint of diffusing the laser beam, the shape of the cell or the shape of light source image 2c is not limited to a square.

Each second lens element 2b is disposed at the focal position of the corresponding first lens element 2a. First laser beam 1a is diffused by these first lens element 2a and second lens element 2b. FIG. 3 shows schematically a state in which first lens element 2a and second lens element 2b diffuse the laser beam.

As shown in FIG. 3, the laser beam which is a parallel light beam is condensed by first lens element 2a and is diffused after passing through second lens element 2b. Here, the angle formed between the light rays that have passed through the uppermost end and the lowermost end of first lens element 2a is referred to as diffusion angle θ. Since the optical path lengths of the light rays within the range of diffusion angle θ are different from each other, a phase differences occur corresponding to the differences in the optical path length between the light rays. These phase differences make it possible to reduce speckle noise.

Diffusion angle θ becomes larger as the radius of curvature of the lens surface of each of first lens elements 2a and second lens elements 2b decreases. Since a larger diffusion angle θ results in a greater difference in the optical path lengths, the reduction effect of speckle noise is increased. Further, the greater the number of lens elements for dividing the laser beam, the greater the diffusion effect of the laser beam, and as a result, the effect of reducing speckle noise increases. Thus, in order to increase the effect of reducing speckle noise, it is desirable to increase diffusion angle θ or to increase the number of lens elements of the first and second lens arrays. Incidentally, when increasing diffusion angle θ, because there are cases in which the optical system or the like of the subsequent stage is increased in size, it is desirable to provide a condenser lens or the like on the optical path of the laser beam that has passed through diffusion element 2.

According to the light source device of the present embodiment, by diffusing the laser beam using diffusion element 2 having a lens array on both the incident surface and the exit surface sides, it is possible to reduce the speckle noise. Diffusion element 2 can be realized with a simple configuration as compared with the light diffusion element having a rotation mechanism. Thus, increase in the size of the device can be prevented and the speckle noise can be reduced with a simple configuration.

In the light source device of the present embodiment, the configuration shown in FIGS. 1 to 3 is an example and can be altered as appropriate.

For example, the light source device may include an integrator into which first laser beam 1a is incident by way of diffusion element 2 and that equalizes the intensity distribution of first laser beam 1a. In this case, it is desirable that the entirety of the light beams emitted by the plurality of second lens elements 2b be incident on the integrator. The light beams emitted by each second lens element 2b may be incident on the integrator without overlapping each other, and also may be incident on the integrator in a state in which a part of adjacent light beams overlaps with other light beams.

Further, the light source device may include a second laser source that emits a second laser beam, a phosphor unit that receives the second laser beam emitted by the second laser source to emit fluorescent light, and a colored light synthesizing unit that color-synthesizes first laser beam 1a emitted by first laser source 1 and the fluorescent light emitted by the phosphor unit into one optical path. In this case, diffusion element 2 may be disposed on the optical path of first laser beam 1a between first laser source 1 and the colored light-synthesizing unit.

Further, the light source device includes a second laser source that emits a second laser beam, an optical member that splits first laser beam 1a emitted by first laser source 1 into a first split light and a second split light and that integrates the first split light and the second laser beam emitted by the second laser source into one optical path, a phosphor unit that receives light integrated into the one optical path to emit fluorescent light, and a colored light synthesizing unit that color-synthesizes the second split light split by the optical member and the fluorescent light emitted by the phosphor unit into one optical path. In this case, diffusion element 2 may be disposed on the optical path of the second split light between first laser source 1 and the colored light synthesizing unit.

In any of the light source devices as described above, the optical member may include a retardation plate and a polarization beam splitter by which first polarized light is reflected and through which second polarized light that is different from the first polarized light is transmitted. In this case, first laser beam 1a emitted by first laser source 1 is incident to one surface of the polarization beam splitter through the retardation plate. The polarization beam splitter may split the first laser beam into first split light made of the first polarized light and second split light made of the second polarized light. Further, first laser beam 1a may be the same color as the second laser beam.

Further, a projector may be provided including a light source device described above, a light modulation unit that modulates light emitted from the light source device to form an image, and a projection lens that projects the image formed by the light modulation unit.

Second Embodiment

FIG. 4 is a block diagram schematically showing a configuration of a light source device according to a second embodiment of the present invention. Incidentally, in FIG. 4, the optical paths and the optical elements are shown schematically, and their sizes and shapes may be different from an actual example.

Referring to FIG. 4, the light source device includes blue light source 11, excitation light source 12, optical member 13, and the phosphor unit 14. Both blue light source 11 and excitation light source 12 are composed of laser modules each comprising a plurality of LD chips, each LD chip emitting blue LD light (linearly polarized light). Light emitted by each LD chip is a pseudo-parallel light beam. Blue light source 11 and excitation light source 12 each correspond to first laser source 1 and the second laser source described in the first embodiment.

Phosphor unit 14 is excited by blue LD light and emits yellow fluorescent light. As phosphor unit 14, for example, a phosphor wheel can be used. The phosphor wheel comprises a rotation substrate. On one surface of the rotation substrate, a phosphor layer including a phosphor that emits yellow fluorescent light is formed along the circumferential direction. Between the phosphor layer and the rotation substrate, a reflection member is provided that reflects the fluorescent light incident from the phosphor layer to the phosphor layer side. Incidentally, by constituting the rotation substrate by a metal material, it is possible to omit the reflecting member.

Optical member 13 includes reduction optical system 25, fly-eye lenses 26a and 26b, dichroic mirror 27, diffusion element 28, and condenser lens 29. Diffusion element 28 corresponds to diffusion element 2 described in the first embodiment.

Blue LD light emitted by blue light source 11 is incident to one surface of dichroic mirror 27 via diffusion element 28. Blue LD light (excitation light) emitted by excitation light source 12 is incident to the other surface of dichroic mirror 27 through reduction optical system 25 and fly-eye lenses 26a and 26b. Reduction optical system 25 reduces the light beam diameter of the excitation light emitted by excitation light source 12. By reducing the light beam diameter, it is possible to reduce the size of the optical system that follows reduction optical system 25. Fly-eye lenses 26a and 26b constitute a light equalizing element that realizes uniform illuminance distribution on the irradiation surface of phosphor unit 14.

Dichroic mirror 27 has the characteristic of reflecting light in the blue wavelength range and transmitting light in other wavelength ranges within the visible wavelength range. Dichroic mirror 27 reflects excitation light at a reflection angle of 45 degrees. The excitation light reflected by dichroic mirror 27 is irradiated to phosphor unit 14 via condenser lens 29. Phosphor unit 14 receives the excitation light and emits yellow fluorescent light toward the condenser lens 29 side. The yellow fluorescent light emitted by phosphor unit 14 enters the other surface of dichroic mirror 27 through condenser lens 29. Condenser lens 29 has a function of condensing the excitation light on the irradiation surface of phosphor unit 14, and a function of converting the yellow fluorescent light from phosphor unit 14 into pseudo-parallel light.

Dichroic mirror 27 transmits yellow fluorescent light emitted by phosphor unit 14 and reflects blue LD light emitted by blue light source 11 in the transmission direction of the yellow fluorescent light. In other words, dichroic mirror 27 is a color synthesizing unit that color-synthesizes the yellow fluorescent light and the blue LD light into one optical path. Light color-synthesized by dichroic mirror 27 is the output light (white) of the light source device of the present embodiment.

In diffusion element 28, similarly to diffusion element 2 described in the first embodiment, a macro lens array is provided on both the incident surface and the exit surface. FIG. 5 shows an example of a micro lens array provided on the incident surface of diffusion element 28.

As shown in FIG. 5, the incident surface of the diffusion element 28 is partitioned into a grid shape and includes a plurality of square cells. Lens element 28a is formed for each cell. That is, on the incident surface of diffusion element 28, a plurality of square lens elements 28a are arranged in a matrix. Although not shown, a plurality of square lens elements 28b are also formed on the exit surface of diffusion element 28, each square lens element 28b facing a respective square lens element 28a. Lens elements 28a on the incident surface and lens elements 28b on the exit surface (not shown) respectively correspond to first lens elements 2a and second lens elements 2b described in the first embodiment.

Blue light source 11 includes a plurality of blue LD chips. Blue LD light emitted by each blue LD chip is incident on a different region of the incident surface of diffusion element 28 without overlapping each other. Similar to the example shown in FIG. 2, in the present embodiment, blue LD light emitted from one blue LD chip is incident on the plurality of lens elements 28a and is thus split into a plurality of light beams. Each lens element 28b emits a light beam incident from the corresponding lens element 28a toward the imaging surface and forms a rectangular light source image in a different region on the imaging surface. Blue LD light that has passed through each lens element 28b diffuses at a diffusion angle θ in the same manner as in the example shown in FIG. 3.

Also in the light source device of the present embodiment, similarly to the first embodiment, since blue LD light is diffused by using diffusion element 28 in which a lens array is provided on both the incident surface and the exit surface, increase in the size of the device can be prevented and the speckle noise can be reduced with a simple configuration.

Although fly-eye lenses 26a and 26b also have a configuration in which a plurality of lens elements are arranged, in these fly-eye lenses 26a and 26b, it is difficult to reduce speckle noise by diffusing a laser beam having a small light beam diameter, such as LD light, as in diffusion element 28.

Specifically, in order to obtain a sufficient reduction effect of speckle noise, it is necessary to increase diffusion angle θ to some extent. To increase diffusion angle θ, it is necessary to reduce the radius of curvature of the lens elements. However, when the radius of curvature of the lens elements is reduced, it is necessary to narrow the distance between the lens array on the incident surface side and the lens array on the exit surface side. There is a physical limit to narrowing the distance between two fly-eye lenses 26a and 26b. Therefore, it is difficult for fly-eye lenses 26a and 26b to obtain a sufficient diffusion effect to reduce speckle noise.

Third Embodiment

FIG. 6 is a schematic diagram showing a configuration of a light source device according to a third embodiment of the present invention. Incidentally, in FIG. 5, the optical paths and the optical elements are shown schematically, and their sizes and shapes may be different from an actual example. For example, for convenience, the figure shows a state in which one optical path jumps over another optical path, but in practice, each optical path is straight and is arranged to intersect with each other in a spatially separated state.

In the light source device shown in FIG. 6, a part of optical member 13 is different from that of the second embodiment, but the configuration is otherwise the same as that of the second embodiment. Optical member 13 includes retardation plate 20, polarization beam splitter 21, mirrors 22 and 23, light integrating unit 24, reduction optical system 25, fly-eye lenses 26a and 26b, dichroic mirror 27, diffusion element 28, and condenser lens 29. Reduction optical system 25, fly-eye lenses 26a and 26b, dichroic mirror 27, diffusion element 28, and condenser lens 29 are as described in the second embodiment.

Blue LD light (linearly polarized light) emitted by blue light source 11 is incident on polarization beam splitter 21 via retardation plate 20. Retardation plate 20 is an element that gives a phase difference between the two orthogonal polarization components to change the state of the incident polarization. As retardation plate 20, for example, a crystal plate such as a quartz plate, a half-wave plate, a quarter-wave plate, or the like can be used. Blue LD light that has passed through retardation plate 20 includes P-polarized light and S-polarized light. Polarization beam splitter 21 is disposed at an inclination of 45 degrees with respect to the optical axis of blue light source 11. Polarization beam splitter 21 is configured to reflect the S-polarized light and transmit the P-polarized light. The reflection angle of the S-polarized light is 45 degrees. Here, the reflection angle is the angle formed between a normal line perpendicular to the incident surface and the traveling direction of the reflected light. Retardation plate 20 and polarization beam splitter 21 are formed so that the division ratio between the S-polarized light and the P-polarized light becomes the value of a desired division ratio.

S-polarized blue LD light reflected by polarization beam splitter 21 is incident to light integrating unit 24 via mirror 22 and mirror 23. Light integrating unit 24 integrates S-polarized blue LD light and blue LD light emitted by excitation light source 12 into one optical path.

For example, excitation light source 12 may emit a plurality of light beams in the same direction in a state in which each beam is spatially separated from the other light beams, and the mirrors that constitute light integrating unit 24 may be provided in the optical path that includes the light beams in a space that does not block each light beam. In this case, the mirrors reflect the S-polarized blue LD light in the same direction as the exit direction of excitation light source 12.

As another example, light integrating unit 24 may be constituted by a polarization beam splitter disposed at an inclination of 45 degrees with respect to the optical axis of excitation light source 12. In this case, excitation light source 12 emits P-polarized blue LD light. The polarization beam splitter transmits the P-polarized blue LD light emitted by excitation light source 12 and reflects S-polarized blue LD light from mirror 23 in the same direction as the exit direction of the P-polarized blue LD light.

Integrated light integrated by light integrating unit 24 is used as excitation light for exciting phosphor unit 14. The integrated light from light integrating unit 24 enters the first surface of dichroic mirror 27 through reduction optical system 25 and fly-eye lenses 26a and 26b. Reduction optical system 25 reduces the light beam diameter of the integrated light from light integrating unit 24. Fly-eye lenses 26a and 26b constitute a light equalizing element that realizes uniform illuminance distribution on the irradiation surface of phosphor unit 14.

Dichroic mirror 27 reflects integrated light at a reflection angle of 45 degrees. Integrated light reflected by dichroic mirror 27 is irradiated to phosphor unit 14 via condenser lens 29. Phosphor unit 14 receives the integrated light, which is excitation light, and emits yellow fluorescent light toward the condenser lens 29 side. The yellow fluorescent light emitted from phosphor unit 14 is incident on the first surface of dichroic mirror 27 via condenser lens 29. Condenser lens 29 has a function of condensing integrated light, which is excitation light, on the irradiation surface of phosphor unit 14, and a function of converting yellow fluorescent light from phosphor unit 14 into pseudo-parallel light.

P-polarized blue LD light transmitted through polarization beam splitter 21 is incident on the second surface (the surface opposite to the first surface) of dichroic mirror 27 through diffusion element 28. Dichroic mirror 27 transmits yellow fluorescent light incident on the first surface and reflects blue LD light incident on the second surface in the transmission direction of the yellow fluorescent light. That is, dichroic mirror 27 color-synthesizes the blue LD light and the yellow fluorescent light into one optical path. Light color-synthesized by dichroic mirror 27 is the output light (white) of the light source device of the present embodiment.

The light source device of the present embodiment, in addition to having the same effect as the second embodiment, can also improve the light utilization efficiency because a portion of the emitted light of blue light source 11 can be turned to the side of excitation light source 12. Further, when configuring blue light source 11 and excitation light source 12 using a laser module having a plurality of LD chips, it is possible to easily optimize the number of LD chips of blue light source 11 and the number of LD chips of excitation light source 12. Furthermore, by configuring retardation plate 20 and polarization beam splitter 21 so that the division ratio between S-polarized light and P-polarized light becomes the value of a desired division ratio, it is possible to obtain output light of a desired color tone.

Fourth Embodiment

FIG. 7 is a schematic view showing a configuration of a light source device according to a fourth embodiment of the present invention. FIG. 7A is a side view and FIG. 7B is a top view.

Referring to FIG. 7A and FIG. 7B, the light source device includes laser module 31 that is a blue light source, excitation light source 32, optical member 33, and phosphor unit 34. Excitation light source 32 includes two laser modules 32a and 32b. Each of laser modules 31, 32a, and 32b has the same configuration, and here, each module is one in which 24 blue LD chips are accommodated in one package. Incidentally, the number of blue LD chips of the laser modules can be changed as appropriate.

Phosphor unit 34 has a structure similar to that of phosphor unit 14 described in the second embodiment. Optical member 33 includes retardation plate 40, polarization beam splitter 41, mirrors 42-44, reduction optical system 45, fly-eye lenses 46a and 46b, dichroic mirror 47, diffusion element 48, and condenser lens 49. Optical member 33 also has basically the same configuration as optical member 13 described in the second embodiment but is different in that light integrating unit 24 is constituted by mirror 44.

In the present embodiment, mirror 44 is provided in a space that does not block each of the light beams in the optical path that includes the parallel light beams emitted by each of laser modules 32a and 32b. Specifically, as shown in FIG. 7A, laser modules 32a and 32b are arranged one over the other. Laser modules 32a and 32b include a light emitting portion that is made of a plurality of LD chips arranged in a matrix and a support portion for supporting the light emitting portion. Since the support portion is larger than the light emitting portion, when laser modules 32a and 32b are arranged on the same plane, a certain amount of space is provided between laser modules 32a and 32b. Mirror 44 can be disposed in the space between laser modules 32a and 32b and is formed in a size capable of reflecting parallel light beams from laser module 31.

Mirror 44 integrates S-polarized blue LD light from polarization beam splitter 41 and blue LD light emitted by laser modules 32a and 32b into one optical path. Integrated light integrated by mirror 44 enters the first surface of dichroic mirror 47 through reduction optical system 45 and fly-eye lenses 46a and 46b. Reduction optical system 45 includes multiple lenses 45a and 45b for reducing the light beam diameter of the integrated light. Fly eye lenses 46a and 46b constitute a light equalizing element. Dichroic mirror 47 reflects the integrated light toward phosphor unit 34. Integrated light reflected by dichroic mirror 47 is incident to phosphor unit 34 via condenser lens 49.

Yellow fluorescent light emitted from phosphor unit 34 enters the first surface of dichroic mirror 47 via condenser lens 49. On the other hand, P-polarized blue LD light transmitted through polarization beam splitter 41 is incident on the second surface of dichroic mirror 47 through diffusion member 48. Dichroic mirror 47 transmits the yellow fluorescent light incident on the first surface and reflects the blue LD light incident on the second surface in the transmission direction of the yellow fluorescent light. That is, dichroic mirror 47 color-synthesizes the blue LD light and the yellow fluorescent light into one optical path.

Also in the light source device of the present embodiment, the same effect can be obtained as in the third embodiment.

Any of the first to fourth embodiments described above can be used as a light source device of a projector. The projector includes a light modulation unit that modulates the emitted light of the light source device to form an image, and a projection lens that projects the image formed by the light modulation unit.

FIG. 8 schematically shows the configuration of a projector according to an embodiment of the present invention. The projector includes light source device 90, illumination optical system 91, three light modulators 92R, 92G, and 92B, cross-dichroic prism 93, and projection lens 94. Light source device 90 is the light source device described in any one of the first to fourth embodiments and emits a parallel light beam which is white light that includes yellow fluorescent light and blue LD light.

Illumination optical system 91 separates the white light emitted by light source device 90 into red light for illuminating light modulator 92R, green light for illuminating light modulator 92G, and blue light for illuminating light modulator 92B. Each of light modulators 92R, 92G, and 92B includes a liquid crystal panel that modulates light to form an image.

Illumination optical system 91 includes fly-eye lenses 5a and 5b, polarization conversion element 5c, superimposing lens 5d, dichroic mirrors 5e and 5g, field lenses 5f and 5l, relay lenses 5h and 5j, and mirrors 5i, 5k, and 5m. White light emitted by light source device 90 is incident to dichroic mirror 5e through fly-eye lenses 5a and 5b, polarization conversion element 5c, and superimposing lens 5d.

Fly-eye lenses 5a and 5b are disposed so as to be opposed to each other. Fly-eye lenses 5a and 5b each include a plurality of microlenses. Each microlens of fly-eye lens 5a faces a respective microlens of fly-eye lens 5b. In fly-eye lens 5a, light emitted from light source section 90 is divided into a plurality of light beams corresponding to the number of microlenses. Each microlens has a shape similar to the effective display area of the liquid crystal panel and condenses the light beam from light source unit 90 to the vicinity of fly-eye lens 5b.

Superimposing lens 5d and field lens 5l direct a principal ray from each microlens of fly-eye lens 5a toward the center portion of the liquid crystal panel of light modulator 92R and superimpose the image of each microlens on the liquid crystal panel. Similarly, superimposing lens 5d and field lens 5f direct a principal ray from each microlens of fly-eye lens 2a toward the center portion of the liquid crystal panel of each of light modulators 92G and 92B and superimpose the image of each microlens on the liquid crystal panel.

Polarization conversion element 5c aligns the polarization direction of light that has passed through fly-eye lenses 5a and 5b with P-polarized light or S-polarized light. Dichroic mirror 5e has a characteristic such that, of visible light, light in the red wavelength range is reflected and light in other wavelength ranges is transmitted.

Light (red) reflected by dichroic mirror 5e is irradiated to the liquid crystal panel of light modulator 92R through field lens 5l and mirror 5m. On the other hand, light (blue and green) transmitted through dichroic mirror 5e enters dichroic mirror 5g through field lens 5f. Dichroic mirror 5g has a characteristic such that, of visible light, light in the green wavelength range is reflected and light in other wavelength ranges is transmitted.

Light (green) reflected by dichroic mirror 5g is irradiated to the liquid crystal panel of light modulator 92G. On the other hand, light (blue) transmitted through dichroic mirror 5g is irradiated to the liquid crystal panel of light modulator 92B through relay lens 5h, mirror 5i, relay lens 5j, and mirror 5k.

Light modulator 92R forms a red image. Light modulator 92G forms a green image. Light modulator 92B forms a blue image. Cross-dichroic prism 93 has first to third incident surfaces and an exit surface. In cross-dichroic prism 93, the red image light is incident on the first incident surface, the green image light is incident on the second incident surface, and the blue image light is incident on the third incident surface. The red image light, the green image light, and the blue image light exit from the exit surface in the same optical path.

The red image light, the green image light, and the blue image light that have exited from the exit surface of cross dichroic prism 93 enter projection lens 94. Projection lens 94 projects the red image, the green image, and the blue image on a screen such that these images coincide with each other.

In the projector of the present embodiment, light source device 90 is made of the light source device described in any one of the first to fourth embodiments, and includes a diffusion element (2, 28, 48) for reducing speckle noise.

A general optical diffusion element having a transmission diffuser plate and a rotation mechanism is configured to diffuse the incident light at random. In contrast, in the diffusion element (2, 28, 48), since each lens element (microlens) emits a plurality of light beams in different directions in the range of diffusion angle θ, the diffusion element has good uniformity of the divergence angle distribution and good light utilization efficiency. Here, the "divergence angle distribution" is the distribution of the divergence angle at the entrance surface of fly-eye lenses 5*a* and 5*b*, which are integrators, of the light beam (divergence light) emitted by each lens element of the diffusion element (2, 28, 48). Since the divergence angle of each lens element is mutually the same, the "divergence angle distribution" of the diffusion element becomes more uniform than that of a general diffusion element which diffuses the incident light randomly.

Further, the "light utilization efficiency" indicates the ratio of light received by the integrator (fly-eye lenses 5*a* and 5*b*) with respect to light emitted from light source device 90. When incident light is diffused randomly, light outside the diffusion angle acceptable by the integrator is increased, and as a result, the light utilization efficiency is reduced. In contrast, according to the diffusion element (2, 28, 48), diffusion angle θ of each lens element is the same. Therefore, by setting the diffusion angle θ to an acceptable diffusion angle in the integrator, the light utilization efficiency can be improved.

EXPLANATION OF REFERENCE NUMBERS

1 First laser source
1*a* First laser beam
2 Diffusion element
2*a* First lens element
2*b* Second lens element
2*c* Light source image

The invention claimed is:

1. A light source device comprising:
a first laser source; and
a diffusion element that diffuses light, the diffusion element being provided on an optical path of a first laser beam emitted by the first laser source,
wherein the diffusion element comprises, on an incident surface, a first lens array in which a plurality of first lens elements are arranged that divide the first laser beam into a plurality of light beams and further comprises, on an exit surface, a second lens array in which a plurality of second lens elements are arranged that each face a respective first lens element of the plurality of first lens elements and that each emit a light beam incident from the facing first lens element toward an imaging surface, wherein each second lens element forms a light source image in a different region on the imaging surface.

2. The light source device according to claim 1, wherein each of the second lens elements forms a square light source image on the imaging surface.

3. The light source device according to claim 1, further comprising an integrator to which the first laser beam is incident through the diffusion element and that equalizes an intensity distribution of the first laser beam,
wherein the entirety of the light beams emitted by each of the second lens elements is incident on the integrator.

4. The light source device according to claim 1, further comprising:
a second laser source that emits a second laser beam;
a phosphor unit that receives the second laser beam emitted by the second laser source and emits fluorescent light; and
a colored light synthesizing unit that color-synthesizes the first laser beam emitted by the first laser source and the fluorescent light emitted by the phosphor unit into one optical path,
wherein the diffusion element is disposed on an optical path of the first laser beam between the first laser source and the colored light synthesizing unit.

5. The light source device according to claim 4, wherein the first laser beam has the same color as the second laser beam.

6. The light source device according to claim 1, further comprising:
a second laser source that emits a second laser beam;
an optical member that splits the first laser beam emitted by the first laser source into a first split light and a second split light and that integrates the first split light and the second laser beam emitted by the second laser source into one optical path;
a phosphor unit that receives light integrated into the one optical path to emit fluorescent light; and
a colored light synthesizing unit that color-synthesizes the second split light split by the optical member and the fluorescent light emitted by the phosphor unit into one optical path,
wherein the diffusion element is disposed on an optical path of the second split light between the first laser source and the colored light synthesizing unit.

7. The light source device according to claim 6, wherein the optical member includes:
a retardation plate; and
a polarization beam splitter by which a first polarized light is reflected and through which a second polarized light that is different from the first polarized light is transmitted,
wherein the first laser beam emitted by the first laser source is incident to one surface of the polarization beam splitter through the retardation plate, and the polarization beam splitter splits the first laser beam into the first split light made of the first polarized light and the second split light made of the second polarized light.

8. The light source device according to claim 6, wherein the first laser beam has the same color as the second laser beam.

9. A projector comprising:
the light source device according to claim 1;
a light modulator that modulates light emitted by the light source device to form an image; and
a projection lens that projects the image formed by the light modulator.

10. A light source device comprising:
a first laser source; and
a diffusion element that diffuses light, the diffusion element being provided on an optical path of a first laser beam emitted by the first laser source,
wherein the diffusion element comprises, on an incident surface, a first lens array in which a plurality of first lens elements are arranged that divide the first laser beam into a plurality of light beams and further comprises, on an exit surface, a second lens array in which a plurality of second lens elements are arranged that each face a respective first lens element of the plurality of first lens elements and that each emit a light beam incident from the facing first lens element toward an imaging surface,
wherein the first laser beam enters each first lens element of the first lens array and is then emitted from each second lens element of the second lens array, and wherein each second lens element forms a light source image in a different region on the imaging surface.

\* \* \* \* \*